United States Patent [19]
Ellero

[11] 3,817,577
[45] June 18, 1974

[54] POWER VEHICLE DRAWN CONTAINER TRANSPORTING DEVICE

[76] Inventor: Charles J. Ellero, 105 Panorama Dr., Bakersfield, Calif. 93305

[22] Filed: Sept. 29, 1972

[21] Appl. No.: 293,475

Related U.S. Application Data

[60] Continuation-in-part of Ser. No. 254,853, May 19, 1972, which is a division of Ser. No. 94,738, Dec. 3, 1970, Pat. No. 3,666,130.

[52] U.S. Cl.................................... 298/5, 298/8 R
[51] Int. Cl............................................. B62b 1/00
[58] Field of Search....... 214/301; 298/5, 8 R, 22 R, 298/8 H, 8 T

[56] References Cited
UNITED STATES PATENTS
1,926,439   9/1933   Fildes................................ 298/8 H
3,409,328   11/1968  Hamby et al....................... 298/8 R Primary Examiner—Albert J. Makay
Assistant Examiner—Lawrence J. Oresky

[57] ABSTRACT

A wheel-supported device capable of selectively and removably engaging a desired number of cargo holding containers for transportation to a desired destination, when the device is pivotally connected to a rear portion of an automotive vehicle such as a truck or tractor. During transportation the containers are supported by engaging forks at elevated positions above the road surface.

In a second embodiment of the invention, the containers are included as an integral part of the device, but are movable by power means from first to second positions whereby the cargo is discharged from the container by force of gravity.

2 Claims, 25 Drawing Figures

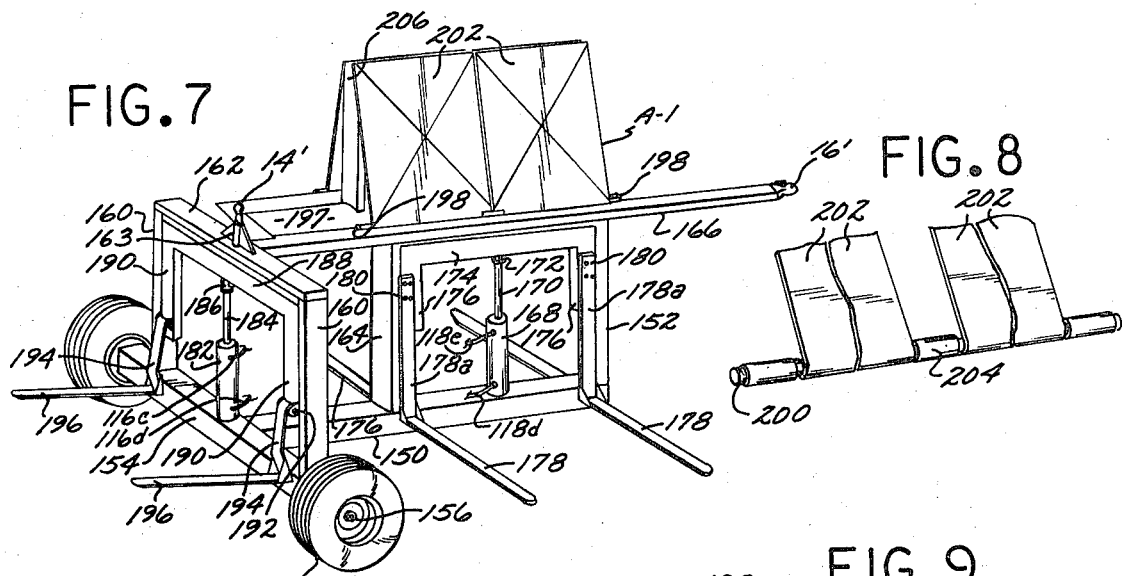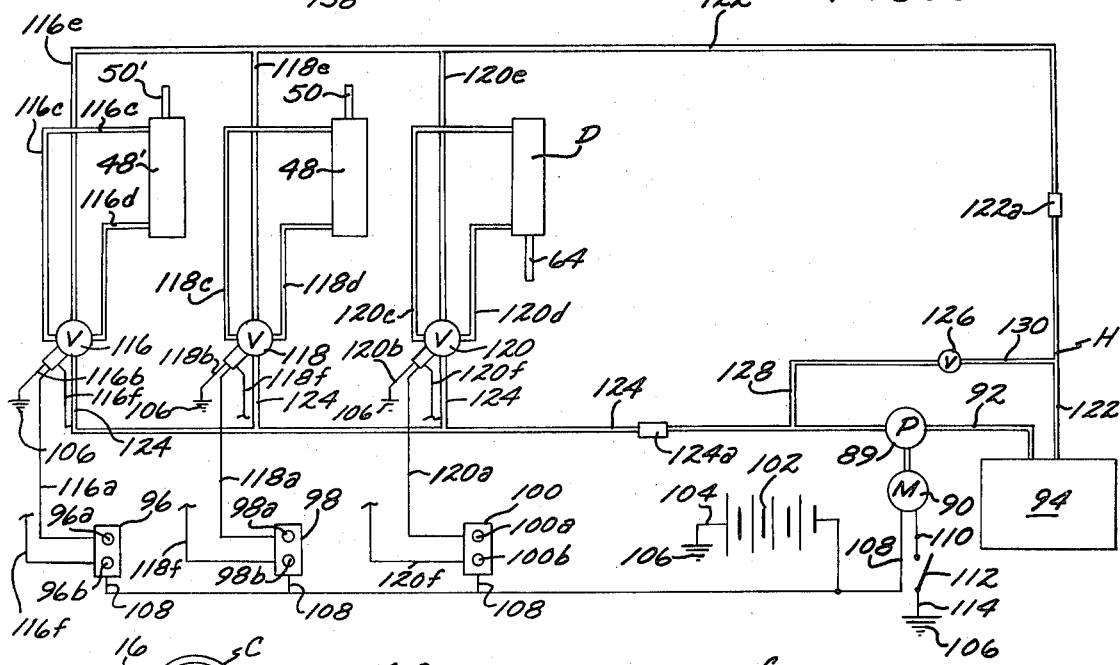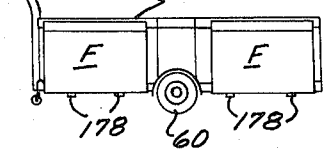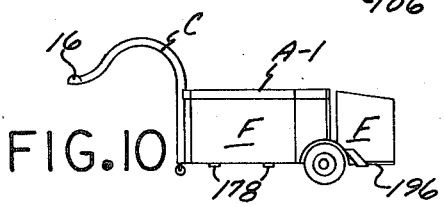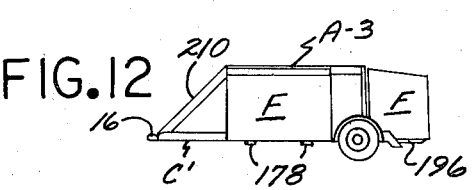

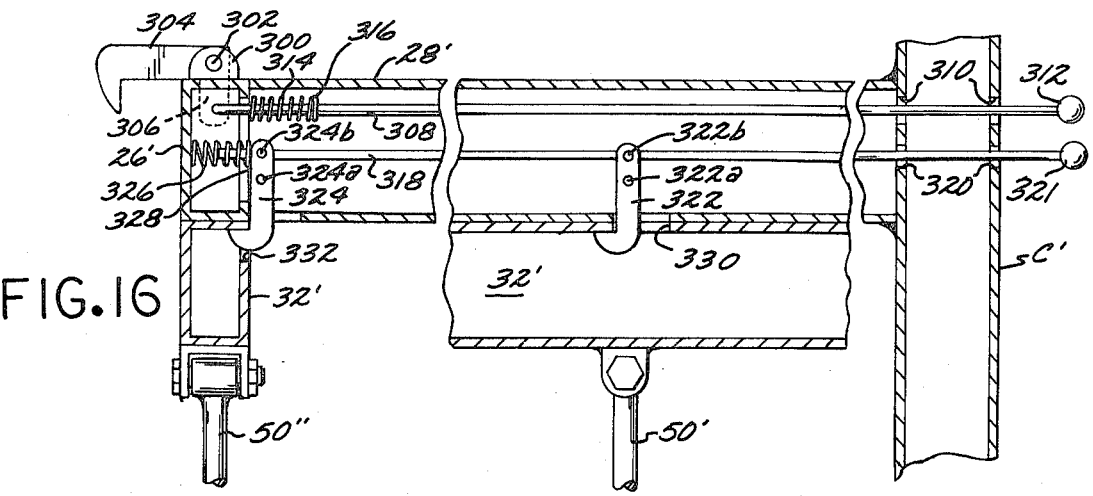
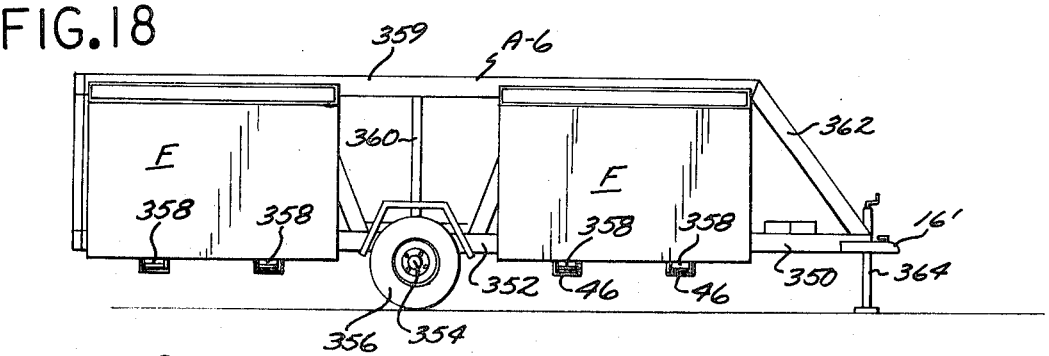
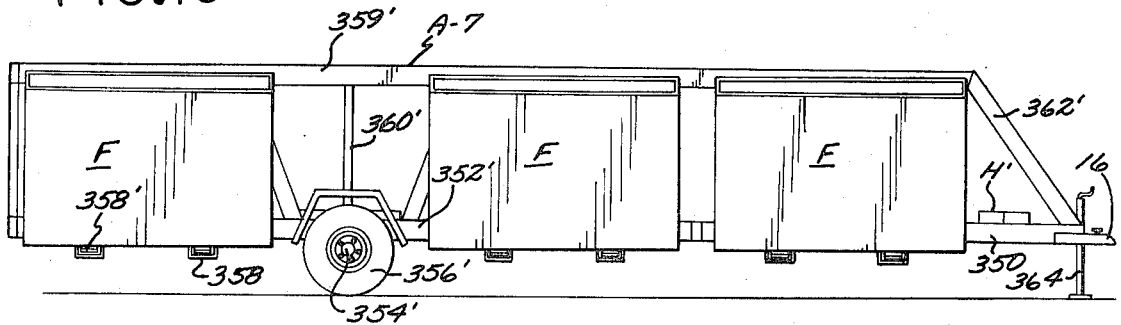
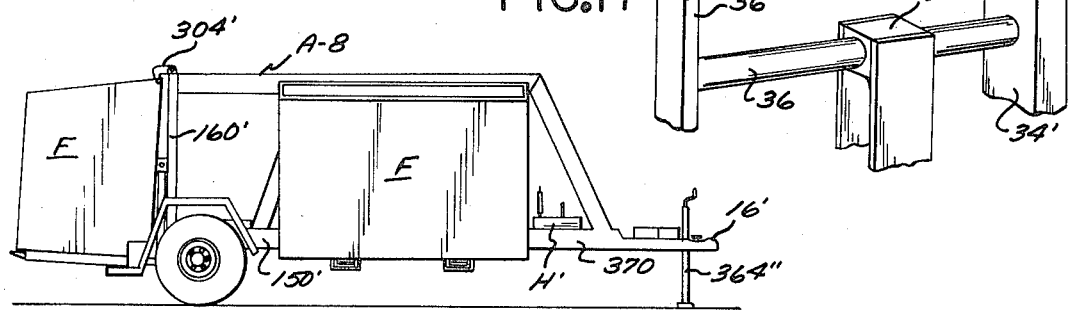

3,817,577

POWER VEHICLE DRAWN CONTAINER TRANSPORTING DEVICE

CROSS REFERENCE TO RELATED APPLICATIONS

This application is a continuation-in-part of U.S. Pat. application Ser. No. 254,853, filed May 19, 1972, which in turn, is a divisional application of U.S. Pat. application Ser. No. 94,738, filed Dec. 3, 1970, now U.S. Pat. No. 3,666,130, entitled "Power-Driven Articulated Container Transporting Device."

BACKGROUND OF THE INVENTION

FIELD OF THE INVENTION

Power vehicle-drawn container transporting device.

SUMMARY OF THE INVENTION

A wheel-supported device having a number of pairs of forks extending outwardly from the sides and rear portions thereof, which by power means operatively associated with the device, may be moved vertically. The forks are adapted to engage pockets formed either on the bottom or the sides of containers, with the containers when engaged by the forks being adapted to be raised to elevated positions where they are transported to a desired destination. After the destination is reached, the forks may be lowered to positions where the containers previously supported thereon are disengaged therefrom.

The wheel-supported device above mentioned may be drawn by a conventional automotive vehicle such as a flat bed truck, tractor, or the like.

In a second embodiment of the invention, the containers are included as an integral part of the wheel-supported device and are movable by power means thereon from first to second positions. When the containers are moved to second positions, they are so disposed that cargo discharges therefrom by force of gravity.

A third embodiment of the invention includes a vertically movable wheel-supported frame and container engaging means that permits the containers to be power lifted to transportable positions.

BRIEF DESCRIPTION OF THE DRAWINGS

FIG. 7 is a perspective view of a second form of container transporting device;

FIG. 8 is a perspective view illustrating covers for the containers being transported on the second form of device;

FIG. 9 is a perspective view of the hydraulic power system used in conjunction with the device;

FIG. 10 is a side elevational view of the first form of the device;

FIG. 11 is a side elevational view of a third form of container transporting device;

FIG. 12 is a side elevational view of a fourth form of container transporting device;

FIG. 13 is a side elevational view of a fifth form of container transporting device;

FIG. 16 is a vertical cross-sectional view of the locking mechanism used in removably maintaining a rear container in a non-movable elevated position on said sixth form of device and for locking the side-positioned containers at elevated positions;

FIG. 17 is a fragmentary perspective view of an adjustable container support used on the sixth form of device;

FIG. 18 is a side elevational view of a seventh form of container transporting device;

FIG. 19 is a side elevational view of an eighth form of container transporting device;

FIG. 20 is a side elevational view of a ninth form of container transporting device;

DESCRIPTION OF THE PREFERRED EMBODIMENTS

Figure 1:
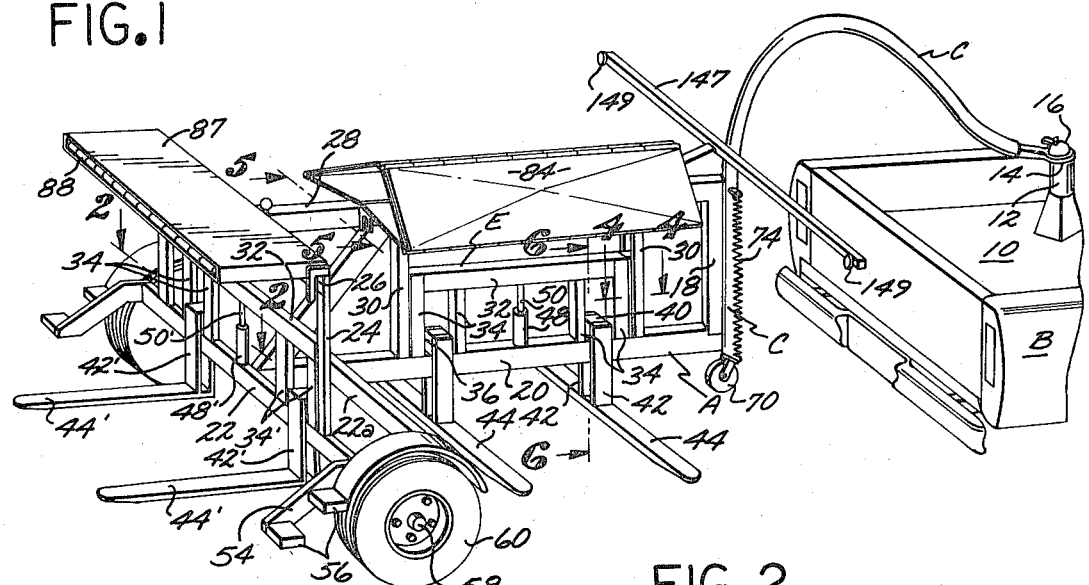
FIG. 1 is perspective view of a first form of container transporting device in which the power means to raise the containers to transportable positions are carried on said vehicle.

The first form A of the container transporting device is illustrated in perspective in FIG. 1 and is adapted to be drawn by a flat bed vehicle B. The rear portion of the bed 10 of vehicle B is provided with an upright 12 secured thereto by conventional means, such as bolts or the like, that terminates on the upper end thereof in a ball 14. The ball 14 is pivotally engaged by a conventional socket 16 that is secured to a drawbar C. The drawbar C is of upwardly and rearwardly extending configuration, and the rear portion thereof develops into a first downwardly extending tubular portion that houses a hydraulic cylinder D. The downwardly extending portion of drawbar C, as may best be seen in FIG. 1, is secured to a first upright 18. Upright 18 is rigidly secured to the forward end of a longitudinally extending chassis member 20, the rear end of which is secured to substantially the center of a lower rear cross piece 22. The rear cross piece 22 supports two laterally spaced rear uprights 24 of channel-shaped transverse cross section, which uprights on their upper ends are joined by a transverse upper piece 26. The upper end of upright 18 and upper rear cross piece 26 are connected by a longitudinally extending rigid member 28. The ends of two longitudinally spaced, vertically extending rigid guide members 30 are connected to the chassis member 20 and the upper longitudinal member 28. The two guides 30, as may best be seen in FIG. 1, are of channel-shaped transverse cross section.

Figure 4:
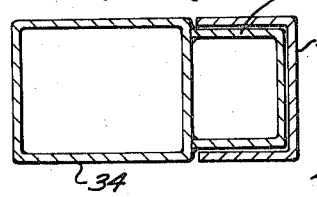
FIG. 4 is a fragmentary transverse cross-sectional view of the device taken on the line 4—4 of FIG. 1.
Figure 6:
FIG. 6 is a fragmentary vertical cross-sectional view of the device taken on the line 6—6 of FIG. 1.

A vertically movable frame assembly E is provided, and the lateral movement thereof is restrained by the guides 30. The frame assembly E includes a rigid, longitudinally extending member 32 that has two pairs of legs 34 depending therefrom, with the lower portions of each pair of legs supporting a longitudinally extending rod 36. Each pair of legs 34 has a vertical elongate element 38 secured thereto that is of rectangular transverse cross section, as may best be seen in FIG. 4, and that snugly and slidably engages the interior surface of one of the guides 30. Each of the rods 36 slidably engages a bore formed in a block 40. Each block is narrowed in width than the space between each of the pairs of legs 34. Two laterally spaced members 42 depend from each block 40, and are secured to substantially the center of a transverse elongate member 44. The portions of the member 44 that extend outwardly in opposite directions from members 42, constitute one of the forks that may removably engage a conventional cargo-holding container F, such as shown in FIGS. 19 and 20, that is provided with channels 46 on either the bottom or sides thereof which may be engaged by the forks 44.

A hydraulic cylinder 48 is supported on the chassis member 20, as may best be seen in FIG. 1, and when fluid is discharged thereinto moves a piston rod 50 upwardly. The piston rod 50 is secured to substantially the center of the longitudinal member 32 to permit raising or lowering of the frame assembly E and the forks 44 by hydraulic means, as will later be explained in detail.

A second frame assembly E' is transversely positioned on the rear of vehicle A, as shown in FIG. 1, with the guides 38 thereof being slidably movable within the rear uprights 24, which uprights are of transverse, channel-shaped cross section. Elements of the frame assembly E' that are common to the frame E are identified by the same numerals previously used, but to which primes have been added.

Figure 2:
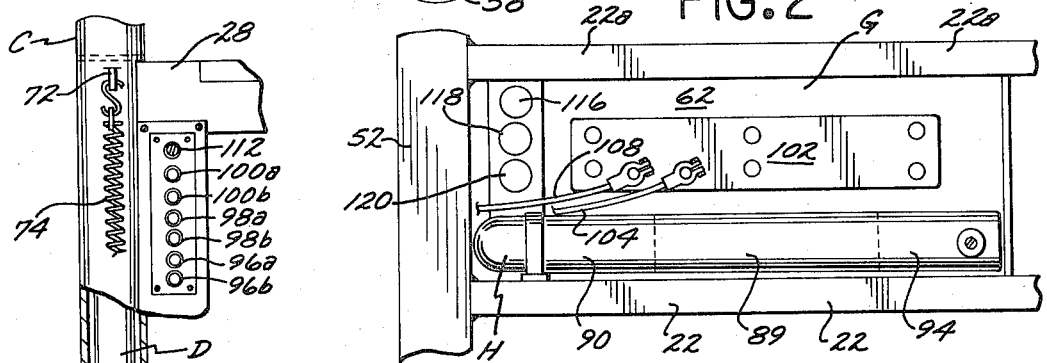
FIG. 2 is a top plan view of the power-supplying means on the device shown in FIG. 1.
Figure 3:
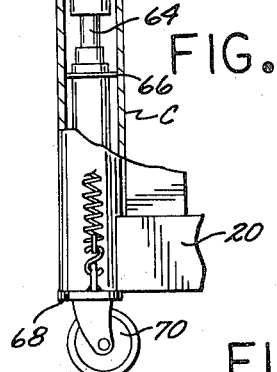
FIG. 3 is a combined side elevational and vertical cross-sectional view of the device shown in FIG. 1.

The members 42' are connected to the forward end of the members 44' rather than the centers of the members 44, as previously described. The ends of the forks 44 and 44' are tapered to permit easy and convenient insertion within the channels 46. A second cross piece 22a is secured to the chassis member 20, with the ends of the cross pieces 22 and 22a being connected by longitudinally extending members 52, as shown in FIG. 2, and with these members 52 on the rear ends thereof developing into downwardly and rearwardly extending members 54, from which steps 56 preferably extend outwardly. Stub shafts 58 are secured to the members 52 and rotatably support pneumatic tired wheels 60. A rigid plate 62 is secured to the bottoms of the cross pieces 22, 22a and the member 52 to define a compartment G in which the power unit H for operating the hydraulic cylinders 48 and 48', as well as the hydraulic cylinder D, is located. The rear portion of the drawbar C, which is of tubular structure, supports hydraulic cylinder D, as illustrated in FIG. 3.

Figure 5:
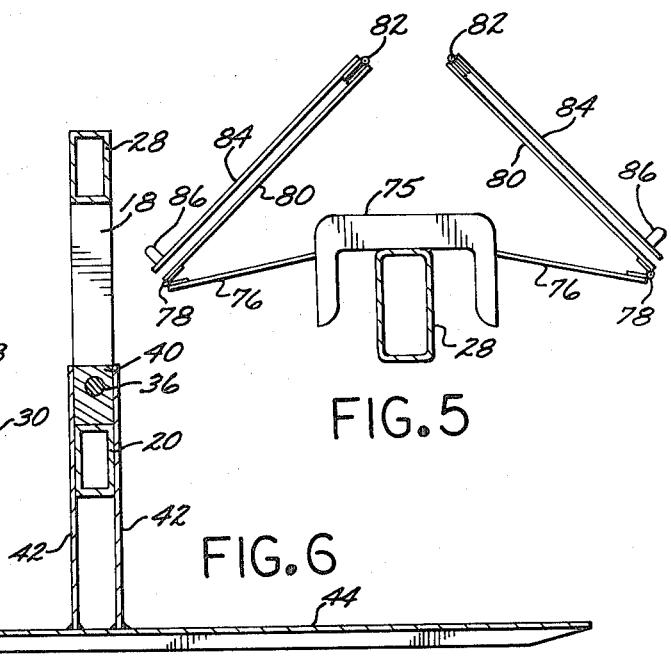
FIG. 5 is a fragmentary vertical cross-sectional view of the device taken on the line 5—5 of FIG. 1.

When fluid is discharged into hydraulic cylinder D it actuates a ram 64 that has a guide 66 secured thereto which slidably engages the interior surface of the drawbar C, and the ram, on the lower end thereof, develops into a transverse lug 68 that serves as a mounting for a conventional caster 70. A second lug 72 extends outwardly from the drawbar C, and the lugs are connected by an elongate, tensioned helical spring 74 that at all times tends to move the ram 64 upwardly to a first position shown in FIG. 3. The details of the power unit H situated in the compartment G are shown in detail in FIG. 14. The upper longitudinal member 28 supports a longitudinally extending cap 75 from which two elongate sheets 76 extend outwardly from opposite sides thereof, with the first sheets 76 on the outer extremities thereof having hinges 78 that serve to pivotally connect second sheets 80 to the first sheets 76. The upper ends of second sheets 80 (FIG. 5) are provided with second hinges 82 secured thereto that are, in turn, connected to third sheets 84. Handles 86 are secured to the third sheets 84 to permit the first, second and third sheets to completely cover the upper open ends of the containers F when the containers are mounted on the forks 44 and disposed in an elevated position.

A box 87 extends rearwardly from the upper rear cross piece 26, and two hinged sheets 88 are disposed therein, as shown in FIG. 1, but which may be withdrawn from the box to cover the open top of a container F when the latter is in an elevated position and supported by the forks 44'.

The power unit H, as shown in FIG. 9, includes a pump 89 that is driven by an electric motor 90. A conduit 92 connects the suction side of pump 89 to a hydraulic fluid reservoir 94. Three electric switches 96, 98, and 100 are provided, which have push buttons 96a, 96b, 98a, 98b, 100a and 100b associated therewith. One terminal of a storage battery 102 is connected by a conductor 104 to ground 106. The other terminal battery 102 is connected by a conductor 108 that extends to switches 96, 98, 100 and motor 90. The other terminal of motor 90 is connected by a conductor 110 to a switch 112 that can only be closed by a key (not shown), with the switch being connected by a conductor 114 to ground 106.

Three solenoid valve assemblies 116, 118 and 120 are provided, first terminals of which are connected by conductors 116a, 118a and 120a to switches 96, 98, and 100. The second terminals of valve assemblies 116, 118, and 120 are connected by conductors 116b, 118b, and 120b to ground 106.

Conduits 116c, 118c, and 120c, extend from valves 116, 118, and 120 to the upper interior portions of cylinders 48', 48, and D, as shown in FIG. 9. The lower interior portions of hydraulic cylinders 48', 48, and D are connected to valves 116, 118, and 120 by conduits 116d, 118d, and 120d. Valves 116, 118, and 120 are connected by conduits 116e, 118e, and 120e to a header 122 that extends to reservoir 94. The discharge of pump 89 is connected to a header 124 which supplies hydraulic fluid under pressure to valves 116, 118, and 120. A pressure relief valve 126 is connected by conduits 128 and 130 to headers 124 and 122, as shown in FIG. 9. Conductors 116f, 118f, and 120f also extend from switches 96, 98, and 100 to solenoid-operated valves 116, 118, and 120.

Switches 96, 98, and 100 and valves 116, 118, and 120 associated therewith each operate in the same manner, and the operation of one only will be described herein. The buttons 96a and 96b of switch 96 are spring-loaded and complete an electric circuit to valve 116, only when one of the buttons is pressed inwardly. Due to being spring-loaded, the valve 116 remains in a first position when not energized, and discharge of fluid therefrom is obstructed. The piston rod 50' is held in a stationary position as a result thereof.

When in a first position the valve 116 also blocks communication between conduits 116c, 116d, and header 124. When it is desired to raise the rear forks 44', the button 96a is pressed inwardly to energize valve 116 to move to a second position where hydraulic fluid discharges into the lower interior portion of cylinder 48' through conduit 116d and fluid in the upper portion thereof discharges therefrom through conduits 116c and 116e back to header 122 to return to reservoir 94.

After the forks 44' have been raised to a desired elevation, pressure is released on button 96a, and valve 116 automaticaliy returns to the first position at which the forms 44' are maintained in a fixed elevated position. Upon it being desired to lower the forks 44', the button 96b is depressed to energize valve 116 to assume a third position in which hydraulic fluid flows to the upper interior portion of cylinder 48' through conduit 116c, and fluid from the lower interior portion of the cylinder discharges through conduits 116d and 116e to header 122 to return to reservoir 94. The position of the switch control buttons on the first form of the device A is shown in FIG. 3.

In operation, the switch 112 is placed in a closed position, and the button 110b depressed to cause the ram 64 to move downwardly, whereby caster 70 contacts the surface on which device A is supported. As it moves downwardly after the caster 70 contacts the ground surface, the ram 64 raises drawbar C to a position where socket 16 is above ball 14. When vehicle B is moved to a position where the ball 14 and socket 16 are in vertical alignment, the drawbar C may be lowered by presenting button 100a inwardly to cause the ball and socket to engage.

The container transporting device A may then be moved by vehicle B to a position where it is desired to pick up containers F. The containers F are moved inwardly relative to the device A whereby the forks 44 and 44' may engage the pockets defined by the channels 46 shown in FIG. 18. Thereafter the containers F may be raised to transportable positions on the device A by use of the switches 96 and 98. After the device A has reached a desired destination, the forks and containers F are lowered by manipulation of switches 96 and 98, as previously explained.

Figure 14:
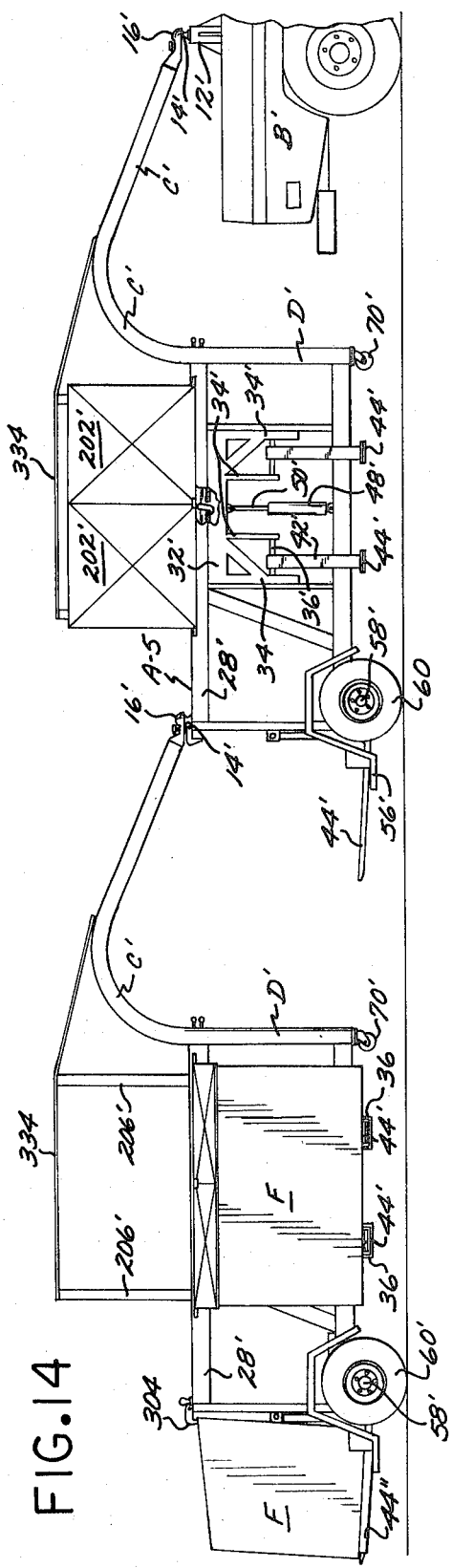
FIG. 14 is a side elevational view of two sixth forms of container transporting devices pivotally connected to one another and to a drawing vehicle.
Figure 15:
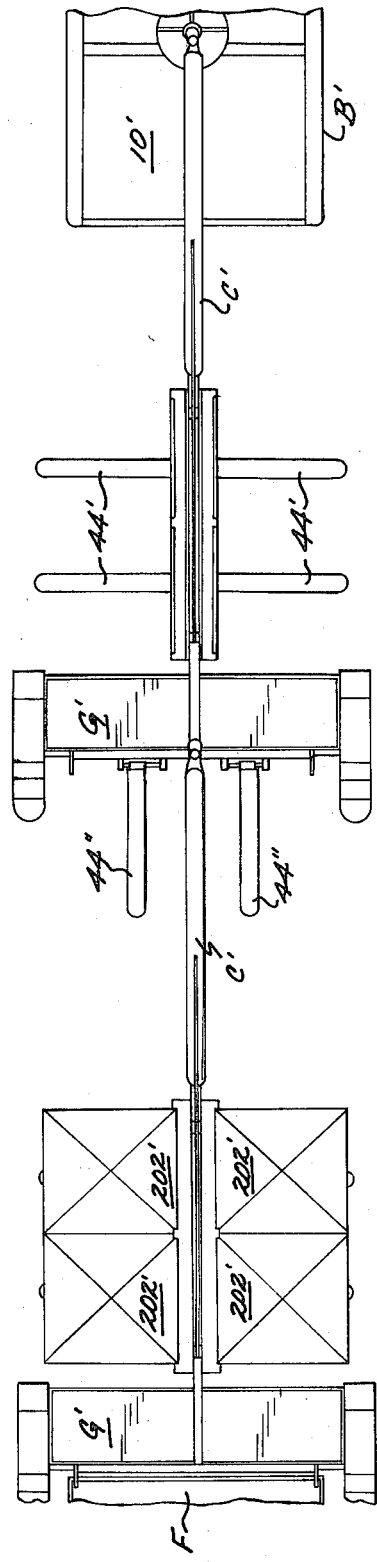
FIG. 15 is a top plan view of the devices shown in FIG. 14.

Although the power unit H is shown as mounted on the device A, if desired, this unit, together with the switches 96, 98, and 100 could be mounted on the vehicle B, with the headers 122 and 124 then extending rearwardly to the device. In such a situation the headers 122 and 124 would be provided with quick disconnect couplings 122a and 124a to permit separation of the device A from vehicle B. A ball 14' is mounted on the upper rear portion of the device A, and is adapted to engage a socket 16' to permit two of the devices A to be drawn by the vehicle B, as shown in FIGS. 14 and 15. The device A preferably has a transverse member 147 supported in an elevated position thereon, which member is provided with lights or light reflectors 149 mounted on the ends thereof.

A second form A-1 of the device is shown in FIG. 7. This second form of the device includes an elongate chassis member 150 to which a forwardly disposed upright 152 is secured that also serves as a guide. The rear end of the chassis member 150 is connected to a lower, rearwardly positioned cross piece 154 that supports stub shafts 156 in a conventional manner on which pneumatic tired wheels 158 are rotatably supported. The cross piece 154 has two laterally spaced uprights 160 secured thereto that are of channel-shaped transverse cross section, which also serve as guides, as will be explained hereinafter. The uprights 160 are connected on an upper cross piece 162 that supports a pedestal 163 on which a ball 14' is mounted. A vertical guide 164 extends upwardly from the chassis member 150 and is connected on its upper end to an elongate, longitudinally extending draw member 166 that terminates on its forward end in a socket 16'. Draw member 166 is also connected to the forwardly disposed upright 152, as well as the upper rear cross piece 162. A hydraulic cylinder 168 is mounted on the chassis member 150, as can best be seen in FIG. 7, with the cylinder having a piston rod 170 extending upwardly therefrom that is connected by conventional means 172 to a longitudinally extending rigid member 174 having legs 176 depending from opposite ends thereof.

Two sets of forks 178 extend outwardly from opposite sides of chassis member 150, and have upwardly extending portions 178a that are connected to opposite sides of legs 176 by conventional means 180, such as bolts, rivets, or the like. Fluid may be discharged into and out of the hydraulic cylinder 168 through conduits 118c and 118d through which hydraulic fluid flows therefrom from the power unit H, in the same manner as described in connection with the first form A of the device.

A second hydraulic cylinder 182 is mounted on the lower rear cross piece 154, as shown in FIG. 7, and a piston rod 184 extends upwardly therefrom that is connected by conventional means 186 to a rigid transverse member 188 that has a pair of legs 180 depending from the ends thereof. The legs 176 and 190 have guide elements 38 projecting outwardly therefrom that are slidably movable in the guides 164 and 152, and in the rear uprights 160 which are of channel-shaped transverse cross section.

Each of the legs 190, by pivotal means 192, supports two members 194 from which two forks 196 project rearwardly and upwardly at a slight angle. The draw member 166 has a sheet 107 extending laterally therefrom in opposite directions, and the sheet 197, by lugs 198, supports two longitudinally extending, laterally spaced rods 200, with each of the rods pivotally supporting two covers 202 that are longitudinally spaced from one another on the rods 200 by a spacer 204, as shown in FIG. 8. Two longitudinally spaced uprights 206 are supported on sheet 198, and these uprights serve as rests for the covers 202 when they are in the upwardly and inwardly extending position, as illustrated in FIG. 7. Hydraulic fluid to the cylinder 182 is supplied through two conduits 116c and 116d that are connected to the power unit H in the same manner as described in connection with the first form A of the device. When the second form A-1 of the device is used, the power unit H will preferably be located on the vehicle B. The use and operation of the second form A-1 of the device is the same as described in connection with the first form A thereof, and need not be repeated.

A third form A-2 of the device is shown in FIG. 11 that is similar in structure to the first form A, other than that the wheels 60' are centrally disposed on the vehicle, and each side of the vehicle has two pairs of forks 178 projecting outwardly therefrom that may removably engage two of the containers F. The forks 178 may be power-operated by the same means as described in conjunction with the first form A, which is also true of the other forms of the device hereinafter described.

A fourth form of the device A-3 is shown in FIG. 12 that is similar to the first form A, other than that the drawbar C' is an extension of the chassis member 20 and has the sockets 16 supported at the forward end thereof. If desired, the structure of the fourth form A-3 of the device may be strengthened by an upwardly and rearwardly extending reinforcing member 210, as may best be seen in FIG. 12.

A fifth form A-4 of the device is shown in FIG. 13 that is similar to the fourth form A-3 and differs from the latter in that each side of the device has two pairs of forks 178 projecting outwardly therefrom for lifting and transporting containers F. Containers F may also be transported on the rear part of the fifth form A-4 of the device by power-operated forks 196 that project rearwardly.

A sixth form A-5 of the device is shown in FIG. 14 and 15, which is structurally similar to the first form A, but modified to include the cover structures shown in the second form A-1 illustrated in FIG. 7. Elements of the sixth form A-5 that are common to the first form A and second form A-1 are identified by the same numbers used in connection with the description of these forms, but to which primes have been added.

The upper longitudinal member 28', as may best be seen in FIG. 15, is of hollow construction. Two laterally spaced lugs extend upwardly from the upper rear cross piece 26' and support a pin 302 therebetween. A downturned L-shaped hook 304 is pivotally supported on the pin 302 and includes a section 306 that extends downwardly through an opening in the cross piece 26' that is pivotally engaged by a rod 208 which extends forwardly in the upper longitudinal member 28' and is slidably supported in openings 310 formed in the draw member C'. A ball handle 312 is mounted on the forwardly extending end of the rod 308.

A compressed helical spring 314 encircles the rod 308, with one end bearing against the upper rear cross piece 26' and the other end against a washer 316 that is welded or otherwise secured in a fixed position on the rod 308. The compressed helical spring 314 at all times tends to maintain the rod 308 in the position shown in FIG. 16 where the hook 304 is so disposed as to engage the upper forward portion of an elevated container F supported on the forks 44'', as shown in FIG. 14. A second rod 318 is longitudinally positioned within the upper longitudinal member 28', and the forward end portions thereof are slidably supported in openings 320 formed in the vertically extending section of the draw member C'. Two hooks 322 and 324 are pivotally supported by pins 322a and 324a, the ends of which are secured to the side walls of the upper longitudinal member 28'. The upper ends of the hooks 322 and 324 are pivotally connected to pins 322b and 324b that extend outwardly from the rod 318. A ball type handle 320 is provided on the forward end of a second rod 318. The rear end of the rod 318 is encircled by a compressed helical spring 326 that bears against the rear side wall of the upper rear cross piece 26' and against a washer 324 that is welded or otherwise secured to the second rod. The compressed helical spring 326 at all times tends to move the rod 318 forwardly and to pivot the hooks 322 and 324 in a clockwise direction where they will engage openings 330 and 332 formed in the members 32', as shown in FIG. 16, to hold them in an elevated position when the forks 44' and 44'' have loaded containers F supported therefrom.

By pressing the first rod 308 to the left, as viewed in FIG. 16, the hook 304 is pivoted in a clockwise direction to permit one of the containers to be engaged thereby. Likewise, by moving the second rod 318 to the left, (FIG. 16) the hooks 322 and 324 are pivoted counter clockwise on the pins 322a and 324a to be disengaged from the member 32', and permit the forks 44' and 44'' to be lowered to a position where the containers F mounted thereon may be slid therefrom onto the ground surface. In FIG. 14 it will be seen that a reinforcing strip 334 may connect the upper ends of the uprights 206' to the drawbar C'.

A seventh form A-6 of the device is shown in FIG. 18 that is similar to the third form thereof A-2, but in which the draw member 350 that supports the socket 16' being an extension of the chassis member. The elongate, longitudinally extending chassis member 352 has transverse shaft means located at substantially the center thereof that rotatably support pneumatic tired wheels 356. Hydraulically operated pairs of forks 358 are provided that are operated by hydraulic means in the same manner as described in the first form A of the invention illustrated in FIG. 1. An upper longitudinally extending member 359 is supported in an elevated position above the chassis member 352 by a number of supports 360. A reinforcing member 362 extends downwardly and forwardly from the member 359 to the member 350 which reinforces the latter. A manually operable jack assembly 364 is provided to raise or lower the forward end of the seventh form A-6 of the device, as well as to stabilize the device in a horizontal position when it is stationary.

An eighth form of the device A-7 is shown in FIG. 19 that is similar to the seventh form A-6, and is distinguished therefrom by being adapted to hold three containers F on each longitudinal side thereof, rather than the two containers F shown in FIG. 18. Components of the eighth form A-7 of the device are identified by the same numerals used with the seventh form A-6, but to which primes have been added.

A ninth form A-8 of the device is shown in FIG. 20, and is similar to the second form A-1 illustrated in FIG. 7, other than it is modified to include an extension 370 of the chassis member 150 and also includes the hook structure illustrated in FIG. 16. The elements common to the previously described devices are identified by the same numerals, but to which primes have been added. A power unit H' is supported on the extension 370.

A tenth form of the device A-9 is shown in FIGS. 21 to 24 inclusive in which a number of containers Y and X formed from segments that may be separated for cargo dumping purposes are permanently mounted on the device.

The device A-9 includes an elongate chassis member 500 that has one end secured to the lower rear cross piece 502, on the ends of which two laterally spaced uprights 504 are secured. The upper ends of uprights 504 are secured to an upper rear cross piece 506. An upper longitudinal member 508 has one end secured to substantially the center of cross piece 506. The forward end of member 508 develops into a downwardly and forwardly extending reinforcing member 510. A section of chassis member 500 forwardly of reinforcing member 510 serves as a drawbar 510a, and a socket 16' is mounted thereon. The socket 16' may engage a ball (not shown) on a power vehicle to permit the device A-9 to be drawn thereby.

The upper longitudinal member 508 has a heavy transverse rod 512 mounted thereon that extends outwardly from both sides thereof. Rod 512 pivotally supports two tubular sleeves 514. The containers X are mounted on opposite sides of member 508, and each of these containers includes a first movable section X-1 and a stationary section X-2.

Each first container section X-1 includes a bottom 515, two side walls 516 and 518, and an end wall 520. Side wall 516 is of a lesser height than side wall 518, as may be seen in FIG. 21. Each of the sleeves 514 is welded or otherwise secured to the upper edge of one of the side walls 518 and to clip 522 that extends upwardly from side wall 516. The side walls 516 and 518 have vertically extending, rearwardly disposed curved edges 516a and 516a.

Figure 21:
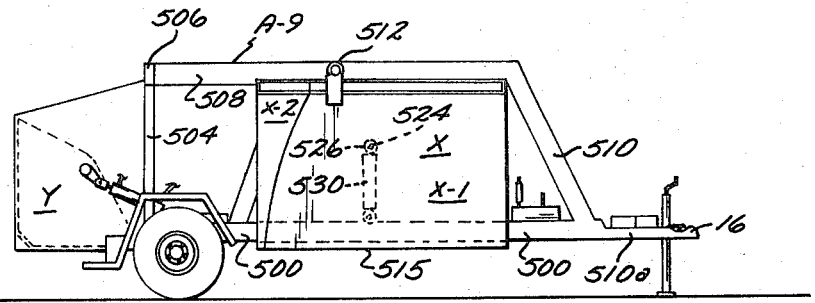
FIG. 21 is a side elevational view of a tenth form of trash-receiving device that is self dumping.
Figure 22:
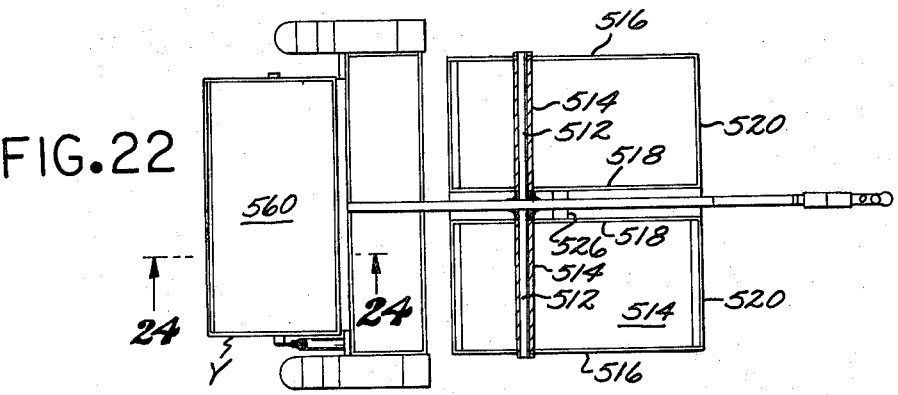
FIG. 22 is a top plan view of the device shown in FIG. 21.
Figure 23:
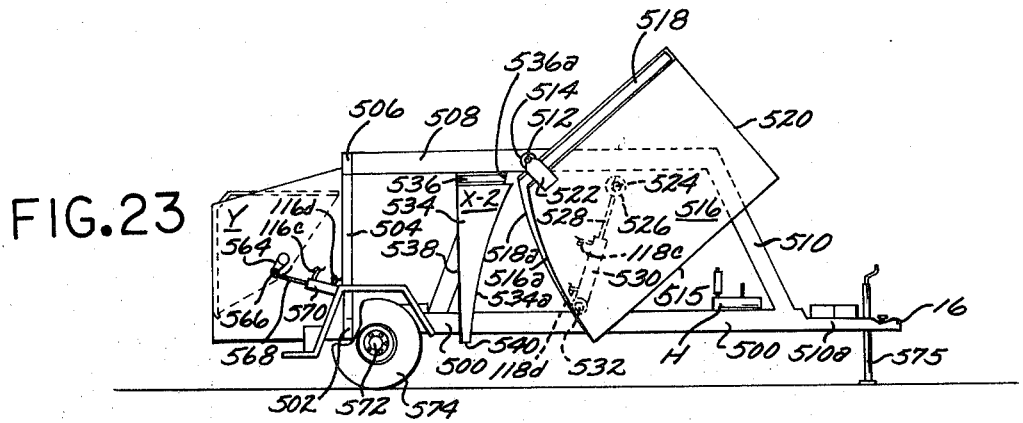
FIG. 23 is a side elevational view of the tenth form of device with the forward portion thereof in a dumping position.

The container sections X-1 are connected by a transverse rod 524 that is pivotally engaged by a sleeve 526, which in turn is secured to the upper end of a piston rod 528 slidably mounted in a hydraulic cylinder 530. Rod 524 is forwardly disposed from rod 512 by a substantial distance, as shown in FIG. 21. The lower end of hydraulic cylinder 530 in which rod 24 is slidably mounted is pivotally connected to chassis member 500 by conventional means 532.

Each of the stationary container sections X-2 includes side walls 534 and 536 of the same height as side walls 516 and 518, a rear wall 538, and a bottom 540. The stationary container sections X-2 are secured to the device A-9 by conventional means, such as welding (not shown) or the like. Side walls 534 and 536 have vertically extending edges 534a that are in abutting contact with edges 516a and 518a when the containers X are in cargo carrying positions, as shown in FIG. 21.

Figure 24:
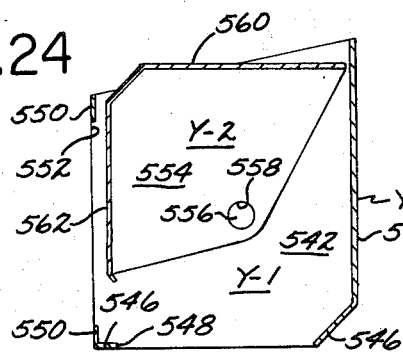
FIG. 24 is a side elevational view of the tenth form of the device, with the rear portion thereof in a dumping position.

The container Y is secured to the rear portion of the tenth form A-9 of the device by conventional means (not shown). Container Y includes a stationary section Y-1 and movable section Y-2. Section Y-1 is comprised of two laterally spaced side walls 542, a forward wall 544, a bottom 546 in which an opening 548 is defined, and a rear wall 550 that has an opening 552 formed therein. Movable container section Y-2 includes two laterally spaced side walls 554 disposed adjacent the inner surfaces of side walls 542. Stub shafts 556 project outwardly from side walls 554 through openings 558 in side walls 542. Two transverse walls 560 and 562 are disposed normally relative to side walls 554 and secured to the edges thereof, as shown in FIG. 24, cargo may be transported within the container Y. One of the shafts 556 is secured to the free end of a piston rod 568 that is slidably mounted in a hydraulic cylinder 570. Hydraulic cylinder 570 is pivotally supported by conventional means (not shown) from the rear of the device A-9. Cylinder 570 is supplied with hydraulic fluid under pressure through conduits 116c and 116d, as is hydraulic cylinder 530 through conduits 118c and 118d. Hydraulic fluid is supplied to the conduits 116c, 116d and 118c, 118d from a power unit H, such as shown in FIG. 9 that is mounted on the forward portion of the device.

The rear of the chassis member 500 supports an axle 572 on which a pair of pneumatic tired wheels 574 are rotatably mounted. A hand operable jack 575 is mounted on drawbar 570a to hold the device A-9 in a horizontal position when not connected to a truck or power-operated vehicle. The device A-9 is loaded with cargo when the containers F are in the positions shown in FIG. 21, with the cargo being discharged therefrom when the container sections X-1 and Y-2 are pivoted to the positions illustrated in FIG. 23.

Figure 25:
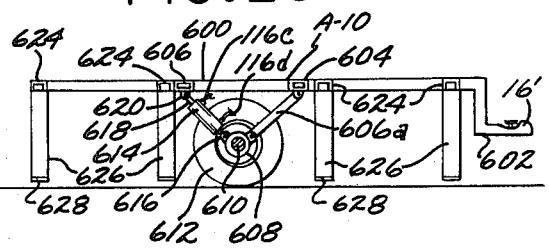
FIG. 25 is a side elevational view of the eleventh form of the device.

An eleventh form A-10 of the device is shown in FIG. 25. This form of the device includes an elongate chassis member 600, the for portion of which develops into a drawbar 602 that has a socket 16' mounted thereon. Two pairs of longitudinally spaced, transversely aligned rigid members 604 and 606 extend outwardly from opposite sides of chassis member 600, and preferably at substantially the center thereof.

End portions of the two members 604 are pivotally connected to two downwardly and rearwardly extending rigid bars 606a, which on their lower extremities are secured to two housings 608 that support a transverse shaft 610 therebetween. The shaft 610 rotatably supports two laterally spaced pneumatic tired wheels 612. Two laterally spaced hydraulic cylinders 614 have first ends thereof pivotally secured to housings 60 by pin 616. The free ends of piston rods 618 that are slidably mounted in the cylinders 614 are pivotally connected to members 606 by pins 620. Hydraulic fluid may be discharged into and out of hydraulic cylinders 614 through conduits 116c and 116d in the same manner as fluid is discharged into and out of cylinder 48', as shown in FIG. 9. When fluid is discharged into cylinders 614 through conduits 116d, the bars 606a, housings 608, shaft 110 and wheels 612 are moved to the right, as viewed in FIG. 12, to elevate the chassis member 600 relative to the ground surface. Lowering of the chassis member 600 is carried out by reversing the flow of hydraulic fluid to the cylinders 614.

Two pairs of rigid members 622 extend outwardly in opposite directions from chassis member 600. Each pair of members 624 has legs 626 depending therefrom that develop on their outer ends into forks 628, which can removably engage the containers F as previously described, and raise the containers to an elevated transportable position. After the desired destination is reached, the forks 628 are lowered to permit the containers F to be disengaged therefrom.

In the previous description of the various forms of the invention, forks have been mentioned as the means of removably engaging the containers F. However, it will be apparent that other means may be used for such purposes, such as platforms on which the containers are removably positioned, and the like.

I claim:

1. A cargo carrying device capable of being drawn by a power vehicle having a trailer hitch pulling means mounted on a rear portion thereof, comprising:
   a. an elongate chassis member;
   b. a pneumatic tired wheel assembly that movably supports said chassis member;

c. a drawbar assembly that extends forwardly from said chassis member and removably engages said pulling means;
d. a pair of containers disposed on opposite sides of said chassis member, each of which containers includes a first pivotally movable section and a second stationary section rigidly secured to said chassis, with said first and second section when said first section is in a first position, being capable of holding a cargo;
e. first means for pivotally supporting said first sections in fixed laterally spaced relationship relative to said drawbar;
f. a source of power;
g. second power means that may be selectively actuated by said source of power to concurrently pivot said first sections from said first positions to second positions where cargo in said containers may drop downwardly therefrom by force of gravity after said device has transported said cargo to a desired destination;
h. a second container disposed rearwardly of said chassis member, which second container includes a first stationary section and a pivotally movable second section, with said first section having an opening formed in the lower portion thereof that is covered by said second section when said second section is in a first position;
i. third means for pivotally supporting said second section from said first section; and
j. fourth power means that may be selectively actuated by said source of power to pivot said second section to a second position to permit cargo in said container to drop therefrom by force of gravity through said opening in said first section of said second container after said cargo has been transported to a desired destination.

2. A device as defined in claim 1 wherein said source of power is supported thereon.

* * * * *

UNITED STATES PATENT OFFICE
CERTIFICATE OF CORRECTION

Patent No. 3,817,577      Dated June 18, 1974

Inventor(s) Charles J. Ellerd

It is certified that error appears in the above-identified patent and that said Letters Patent are hereby corrected as shown below:

Applicant's name should read -- Charles J. Ellerd --.

Signed and sealed this 1st day of October 1974.

(SEAL)
Attest:

McCOY M. GIBSON JR.
Attesting Officer

C. MARSHALL DANN
Commissioner of Patents